May 3, 1960 T. E. ROSE 2,935,215
MACHINES FOR UNLOADING JARS OR THE LIKE FROM CARTONS
Original Filed July 7, 1953 10 Sheets-Sheet 8

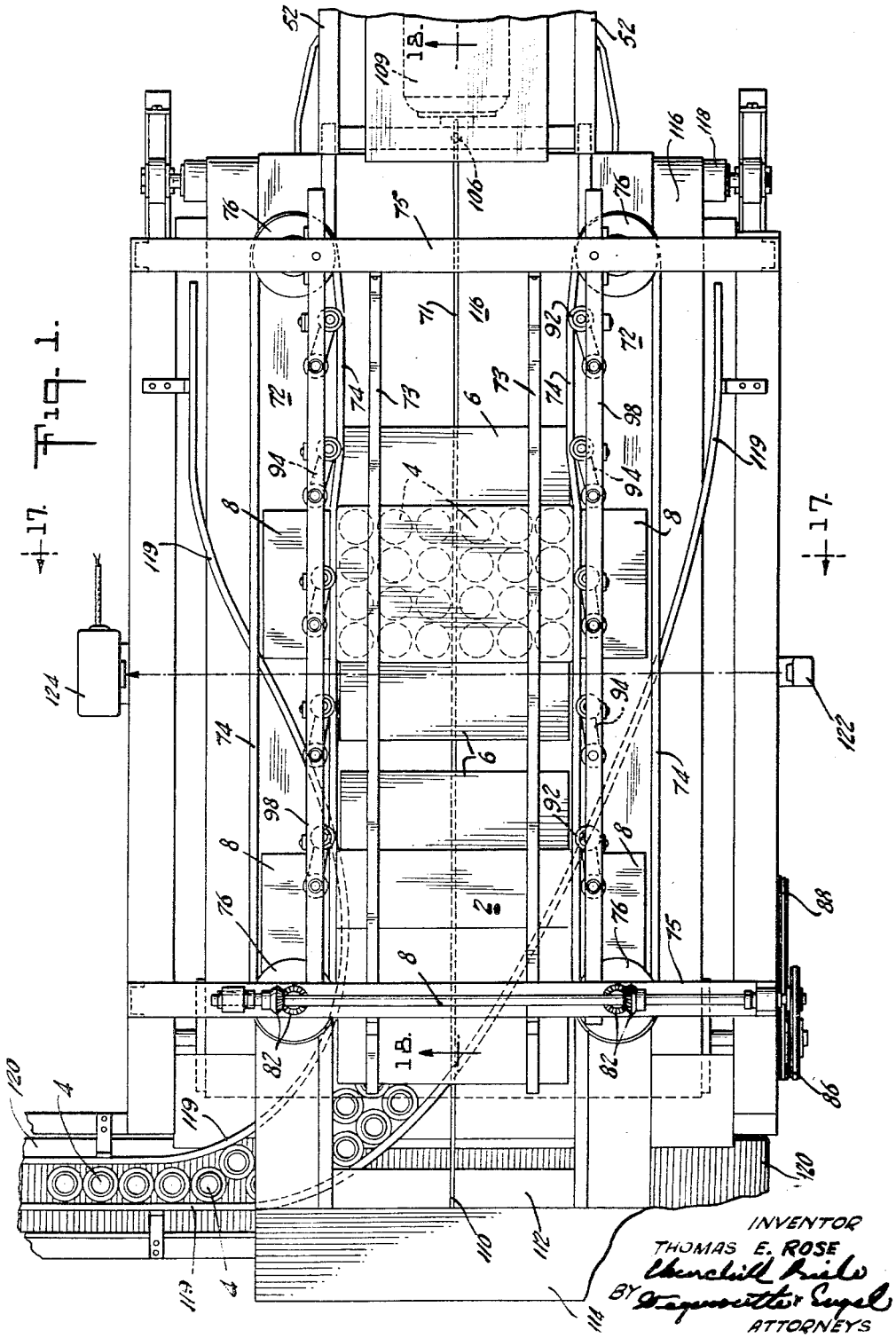
May 3, 1960     T. E. ROSE     2,935,215
MACHINES FOR UNLOADING JARS OR THE LIKE FROM CARTONS
Original Filed July 7, 1953     10 Sheets-Sheet 1
INVENTOR
THOMAS E. ROSE
ATTORNEYS May 3, 1960 T. E. ROSE 2,935,215
MACHINES FOR UNLOADING JARS OR THE LIKE FROM CARTONS
Original Filed July 7, 1953 10 Sheets-Sheet 2
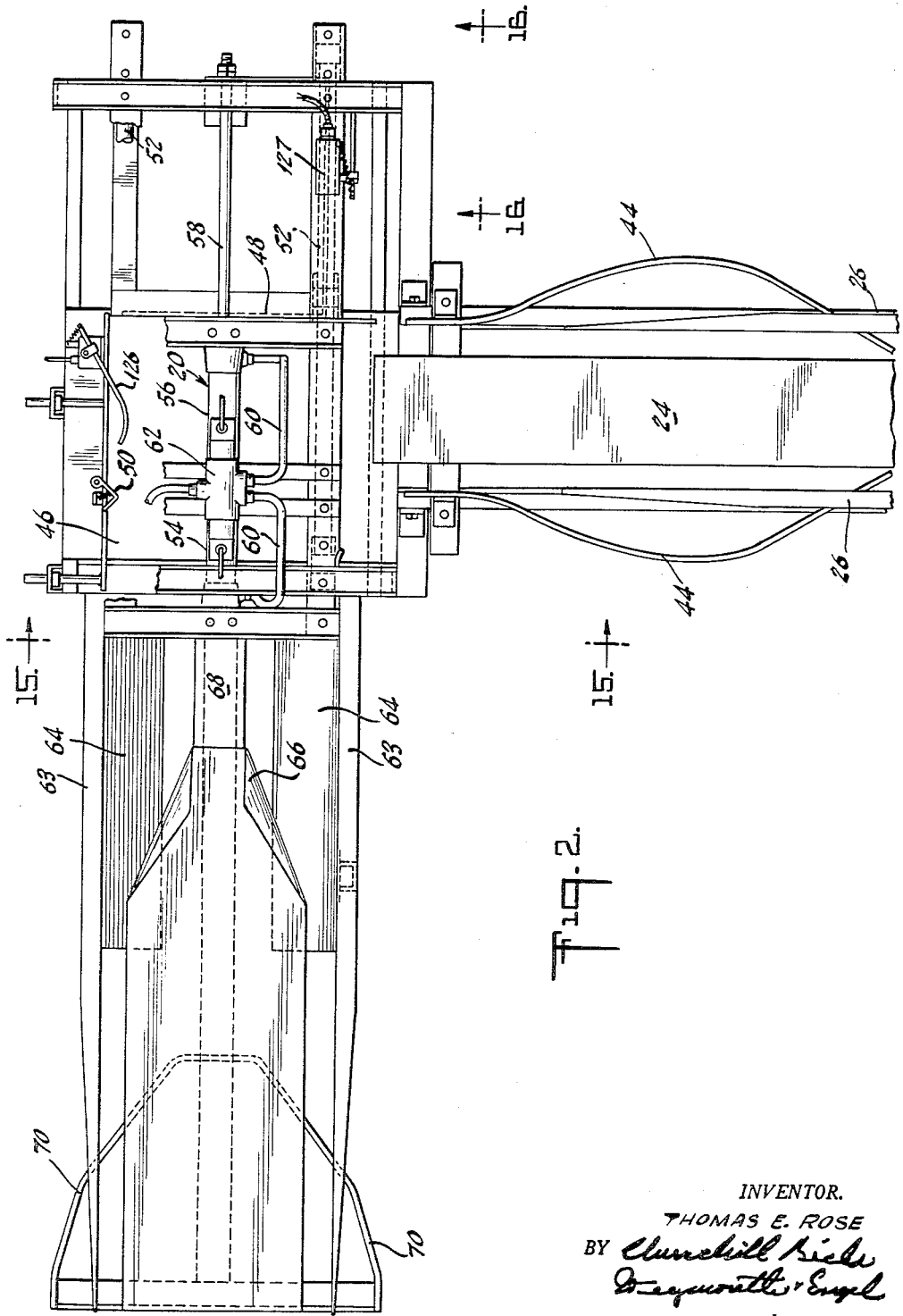
INVENTOR.
THOMAS E. ROSE
BY
ATTORNEYS

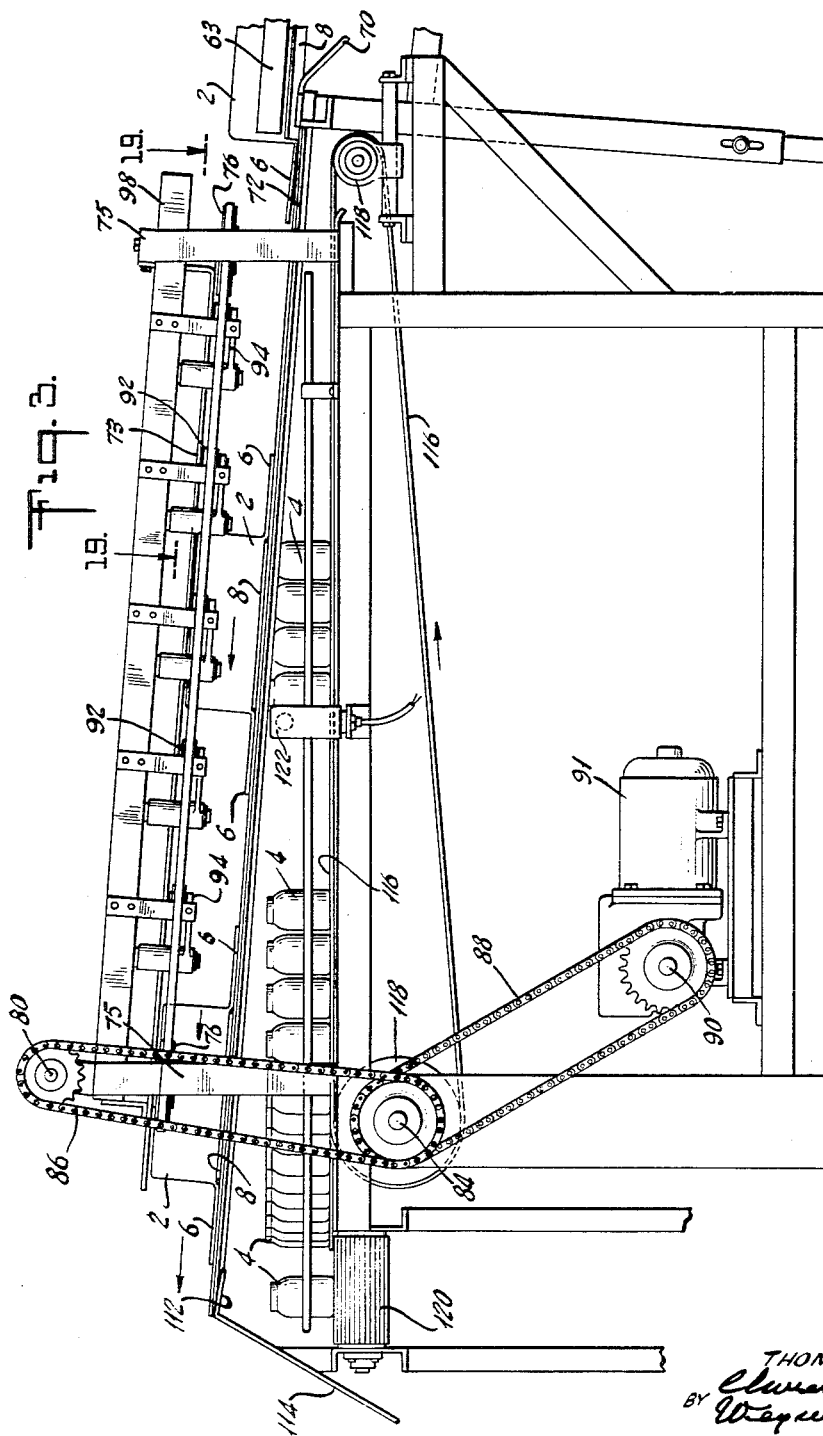

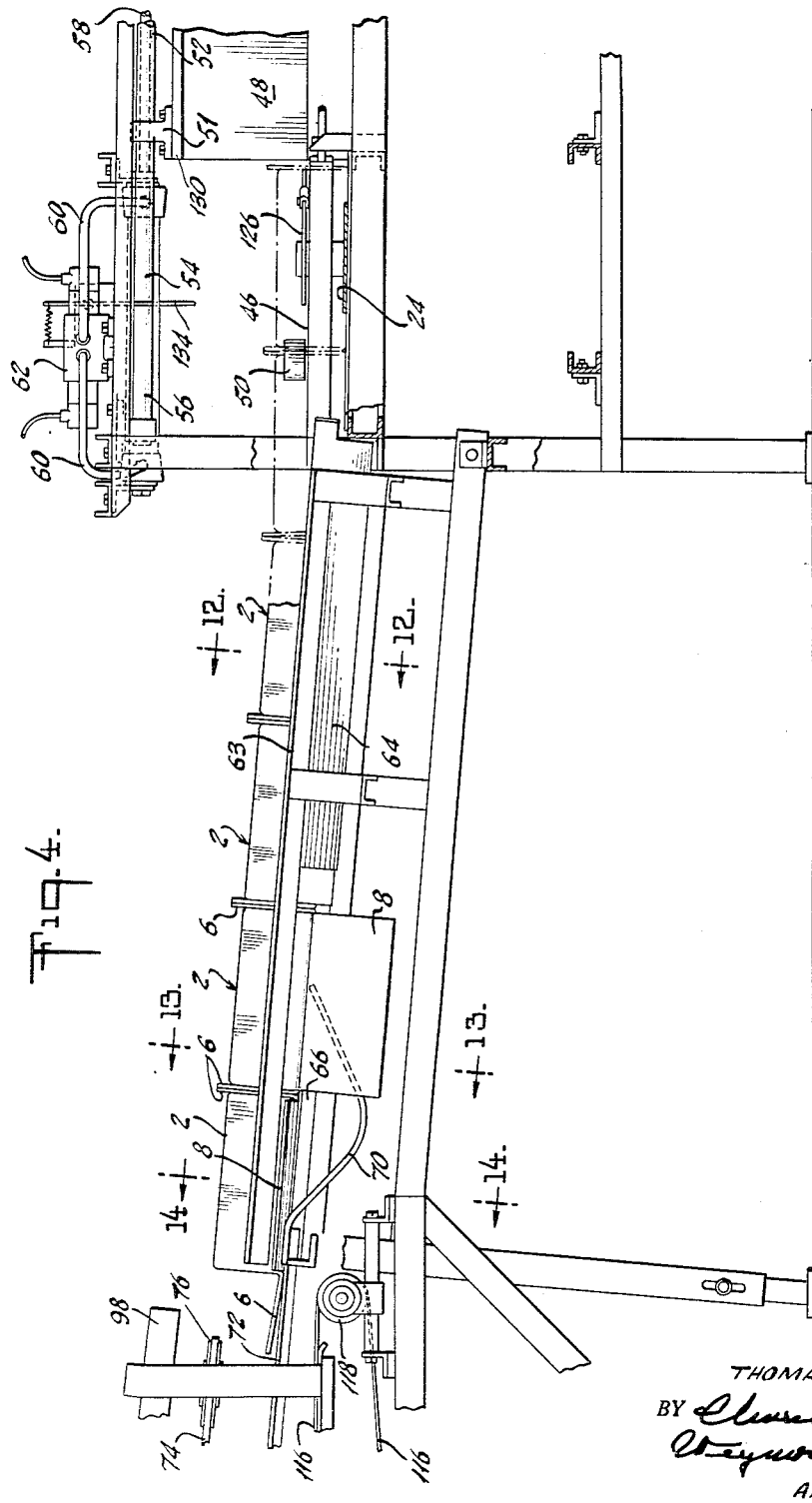

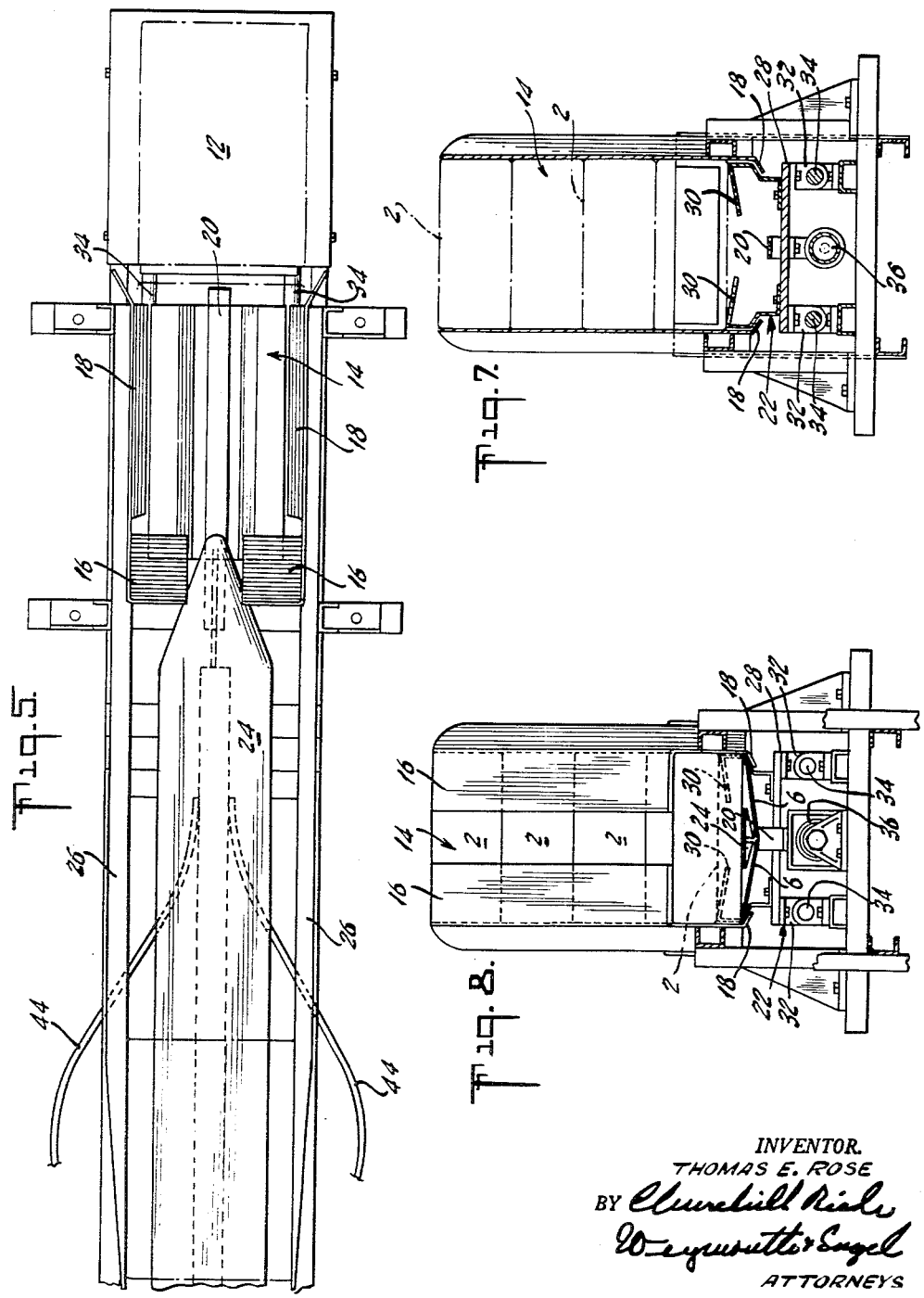

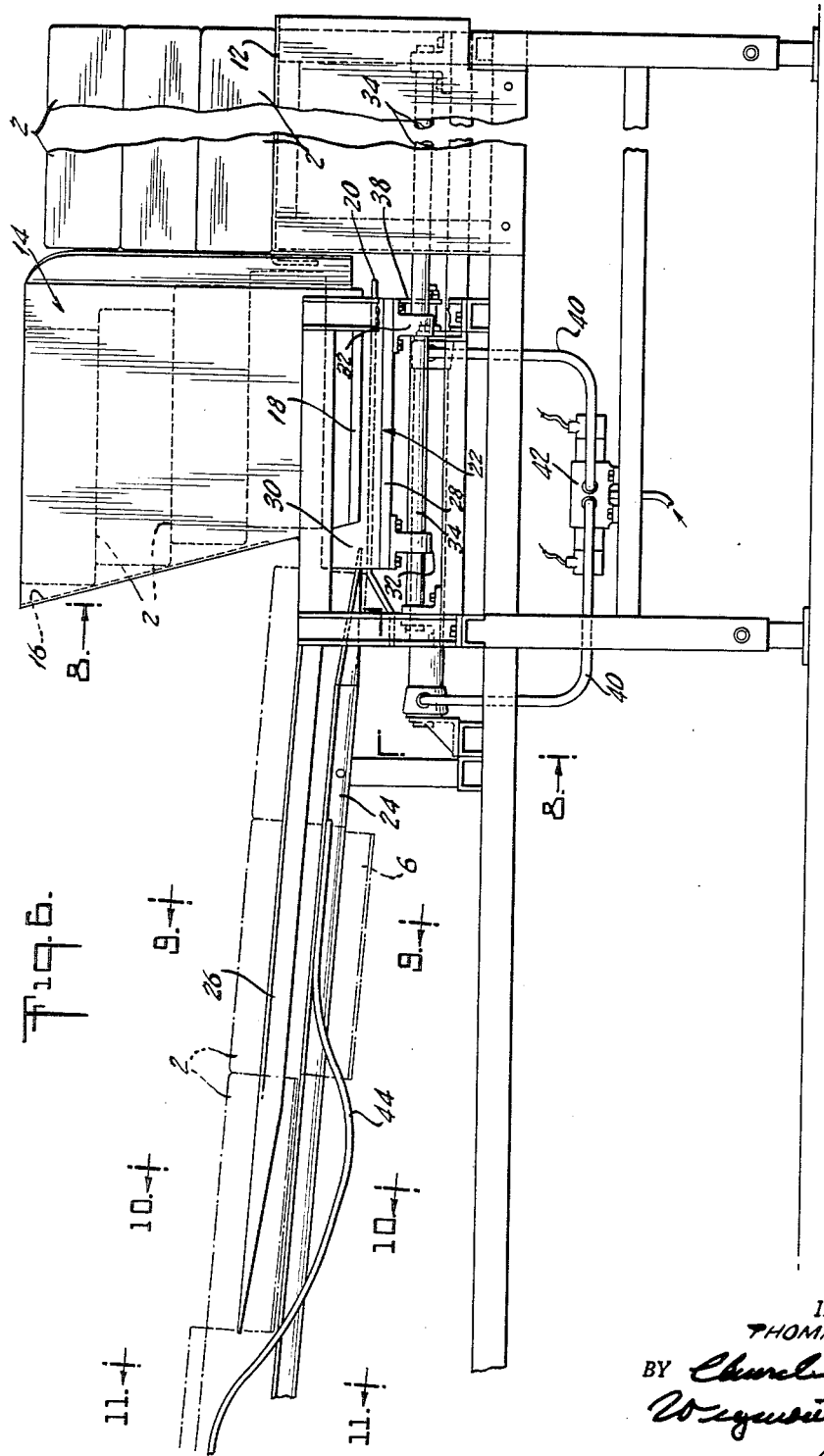

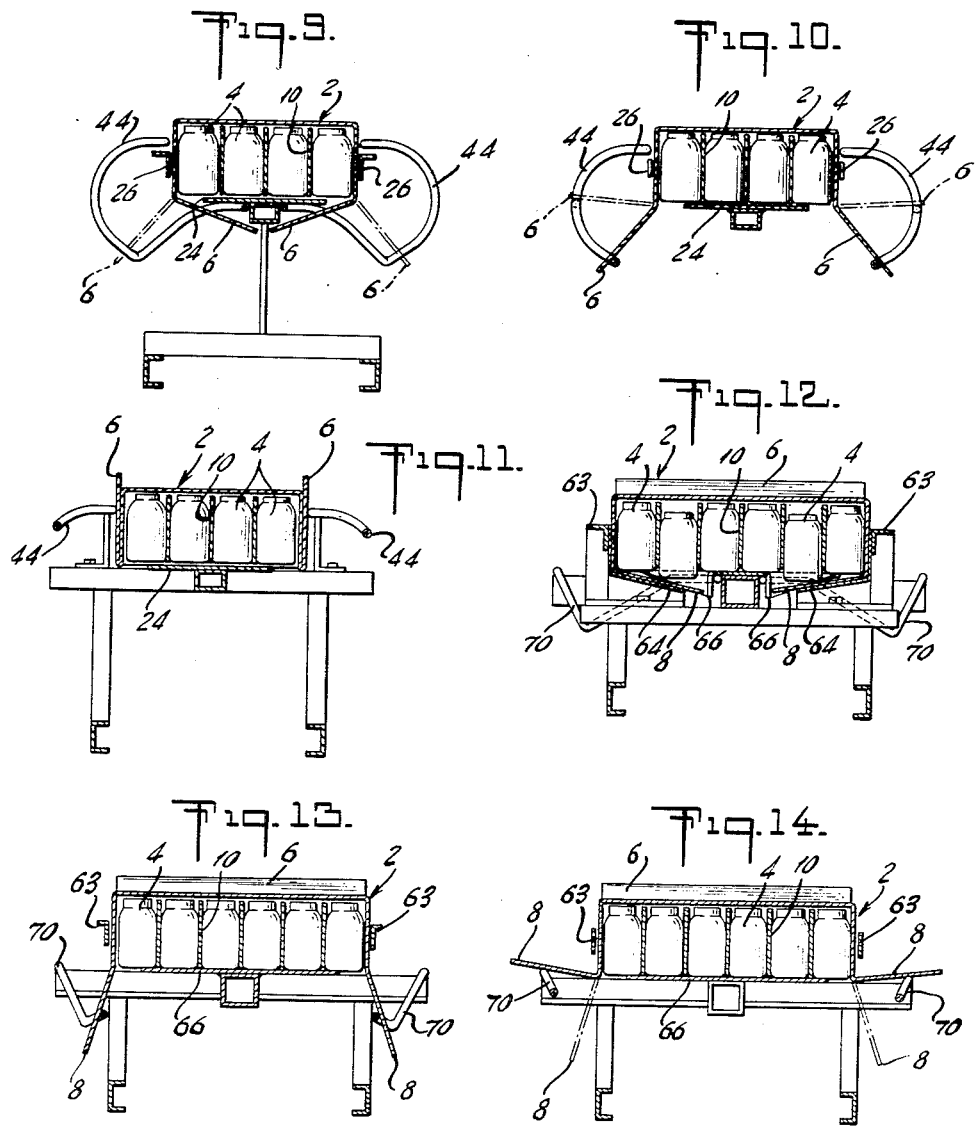

INVENTOR.
THOMAS E. ROSE
BY
ATTORNEYS

INVENTOR
THOMAS E. ROSE
ATTORNEY

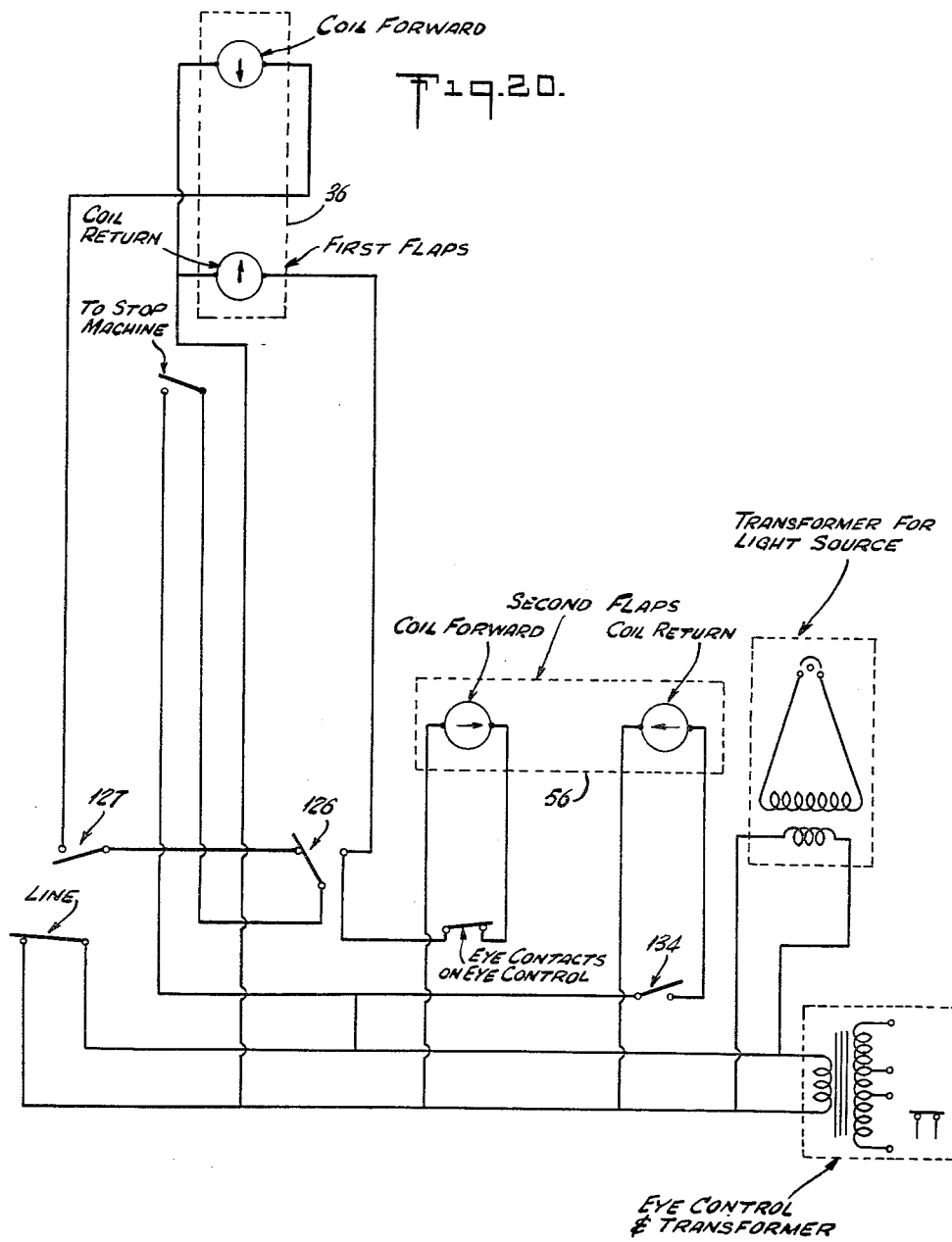

United States Patent Office 2,935,215
Patented May 3, 1960

2,935,215

MACHINES FOR UNLOADING JARS OR THE LIKE FROM CARTONS

Thomas E. Rose, San Jose, Calif., assignor to Beech-Nut Life Savers, Inc., Canajoharie, N.Y., a corporation of New York Continuation of application Serial No. 366,487, July 7, 1953. This application April 18, 1957, Serial No. 654,055

8 Claims. (Cl. 214—304)

The present invention relates to machines for opening cartons containing jars or similar articles, and for removing the jars from the cartons and delivering them to a jar-filling or other machine.

One of the objects of the present invention is to provide a machine of this character which is simple in construction and efficient in operation.

Another of the objects of the invention is to provide a machine of this character which is particularly adapted for opening cartons of small glass jars, such as those used for baby foods, and successively removing the jars from the cartons and delivering them at a predetermined rate to jar-filling machines in such a manner that there is no danger of the jars being broken or chipped during handling by the machine.

The several features of the invention, whereby these and other objects may be attained, will be readily understood from the following description and accompanying drawings, in which Figures 1 and 2 are plan views, with certain parts broken away, of rear and front portions of the machine respectively;

Figs. 3 and 4 are side views of the portions of the machine shown in Figs. 1 and 2;

Fig. 5 is a plan view of the filled carton-receiving portion of the machine, this view showing a portion of the machine shown in Fig. 2;

Fig. 6 is a side view of the same, with certain parts broken away;

Figs. 7 and 8 are sectional views, taken substantially on the line 7—7 and 8—8, respectively of Fig. 6.

Figure 15:
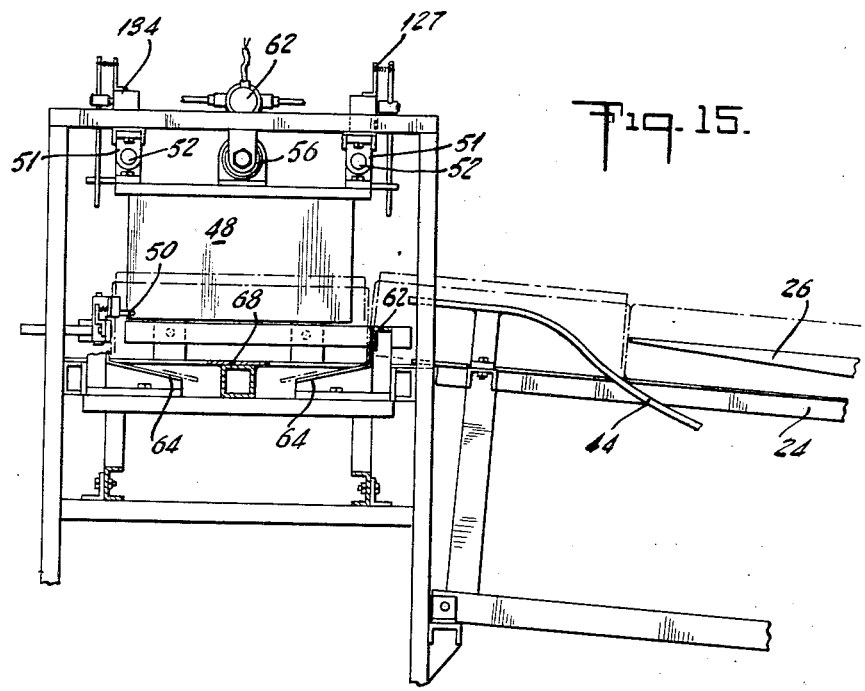
Figure 16:
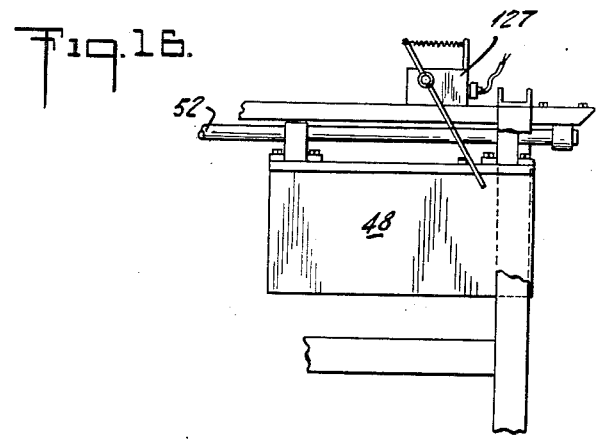
Figure 17:
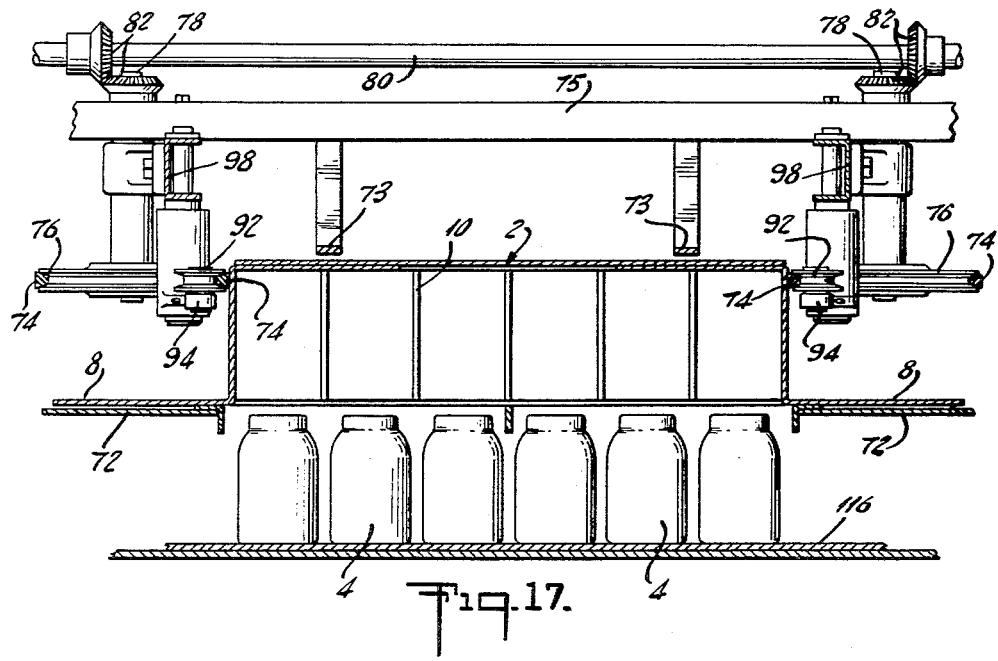
Figure 18:
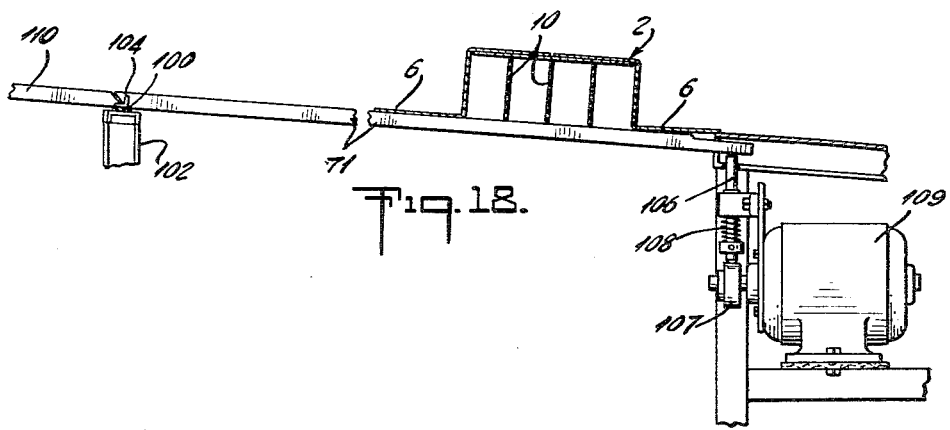
Figure 19:
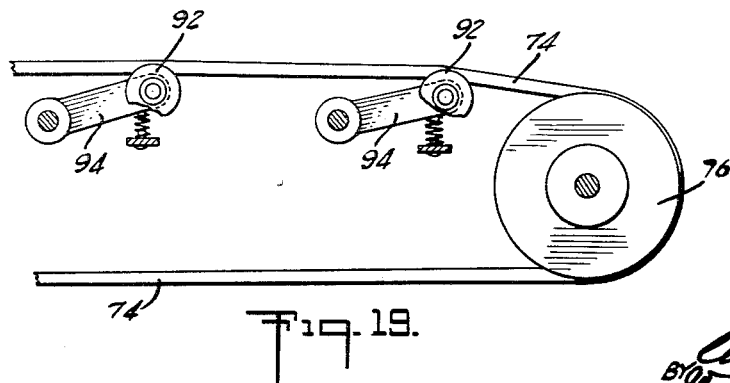

Figs. 9, 10 and 11, are sectional views respectively taken on the lines 9—9, 10—10, and 11—11 of Fig. 6;

Figs. 12, 13 and 14 are sectional views respectively taken on the lines 12—12, 13—13, and 14—14, of Fig. 4;

Fig. 15 is a sectional view taken on the line 15—15 of Fig. 2;

Fig. 16 is a side view of a portion of the machine shown in Fig. 2, the view being taken in the direction of the arrows 16—16;

Fig. 17 is a sectional view, taken on the line 17—17 of Fig. 1;

Fig. 18 is a sectional view, taken on the line 18—18 of Fig. 1;

Fig. 19 is a detail sectional plan view, taken on the line 19—19 of Fig. 3;

Fig. 20 is a schematic view of electric circuit connections with certain parts of the machine.

The machine illustrated in the drawings is particularly adapted for use in opening and emptying cardboard cartons 2 commonly employed for packing small glass jars 4, such as those for containing baby foods. The cartons are provided with the usual outer flaps 6 and inner flaps 8, and the jars are held in position in the cartons by means of the usual dividers 10 (Figs. 9 and 14).

The cartons are supplied to the machine in inverted position with their flaps closed but unsecured, and the jars are placed in the cartons in inverted position as shown in Figs. 9 and 14.

The cartons to be opened and emptied may be stacked by the operator on a platform 12 of the machine (Fig. 6) or suitable feeding means (not shown) may be employed for feeding the cartons to the machine.

Preliminary to the starting of the machine the operator slides a stack of cartons from the platform 12 into a magazine 14 against a rear wall 16 thereof, the cartons dropping upon the bottom wall of the magazine.

The rear wall 16 of the magazine is inclined downwardly and forwardly so as to guide the cartons into proper position on the bottom wall as they drop thereon, the inclination of the rear wall insuring the cartons in the stack being maintained in a horizontal position as they drop down upon the bottom wall.

The bottom wall of the magazine consists of inwardly directed flanges 18 on which the longitudinal edges of the bottom of the lowermost carton rests (Figs. 5 and 8). These flanges are inclined as shown so that when a carton drops thereon the outer flaps 6 of the carton are open slightly by the weight of the jars, the degree of opening being limited by the engagement of the end edges of the flaps with a bar 20 secured to the machine frame (Fig. 6).

When a stack of filled cartons have thus been placed in the magazine and the machine is started, a ram 22 advances so as to feed the bottom carton from the stack and on to a plow 24, the cartons being guided on the plow by rails 26. The forward end of the plow 24 is V-shaped and slightly spoon-shaped so as to freely enter above the partially opened outer flaps 6 with the inner flaps 8 resting on the plow so as to hold the inner flaps closed and the jars and dividers in the carton. As the cartons are thus pushed over the plow the outer flaps 6 are swung downwardly thereby, the cartons passing slightly beyond the inner end of the bar 20.

During such feeding movement of the ram 22, the remaining cartons in the stack drop down upon the top of the ram and are supported thereby until the ram has been retracted, whereupon the stack of cartons drop down upon the bottom wall flanges 18 of the magazines so as to cause the next carton to be positioned in alinement with the ram.

During the next advancing movement of the ram 22 and as the carton leaves the magazine, the carton is pushed on to the plow 24 which in turn pushes the previously ejected carton a distance over the plow.

The cartons are thus successively fed from the magazine by the ram 22, and the cartons are pushed over the plow one behind the outer.

When there is but one carton left in the magazine the operator slides another stack of cartons from the table 12 into the magazine.

The ram 22 comprises two opposed sheet metal members having their lower ends secured to a slide 28, and upper portions 30 forming the top of the ram. The portions 30 are inclined downwardly and inwardly permitting partial opening of the outer flaps of the lowermost carton in the stack when the carton drops thereon. The sides of the ram are suitably shaped so as to clear the bottom flanges 18 of the magazine. The slide 28 has depending lugs 32 secured on the under side thereof which are mounted to slide on rods 34 secured to the machine frame.

The slide 28 is reciprocated to reciprocate the ram 22, by means of a fluid operable piston and a cylinder 36, the piston having its rod projecting from one end of the cylinder and secured to the slide 28 by means of a bracket member 38. Air under pressure is supplied to the ends of the cylinder to operate the piston through pipes 40 controlled by a solenoid controlled valve 42 as hereinafter described.

As the cartons are pushed over the plow 24, the outer flaps engage suitably curved rods 44 which serve to swing the flaps first outwardly and then upwardly against the sides of the cartons as illustrated in Figs. 9, 10 and 11, the guide rails 26 for the cartons terminating short of the point where the flaps are finally positioned against the cartons so as not to interfere therewith.

With the outer flaps in vertical position the cartons are successively pushed from the end of the plow 24 upon a platform 46. After each carton is thus deposited on the platform 46, a ram 48 pushes it sidewise over the platform a distance of substantially the total width of the carton and the upwardly folded flaps. As the ram reaches the limit of its carton feeding stroke, a spring clip 50 snaps over the edge of the front outer flap 6 of the carton so as to retain the flap in its vertical position during the retracting stroke of the ram.

The ram 48 has lugs 51 secured on the top thereof that are mounted to slide on rods 52 secured to the machine frame. The ram is reciprocated by means of a piston 54 in a cylinder 56, the piston rod 58 being secured to the ram. The piston is fluid operated through pipes 60 connected with the ends of the cylinder and the passage of compressed air to the cylinder is controlled by a solenoid controlled valve 62 hereinafter described.

The cartons are pushed by the ram 48 between guide rails 63 and over supporting tracks 64 on which the outer end edges of the cartons slide, the top surfaces of the tracks being inclined transversely downwardly and inwardly to permit the inner flaps 8 to open slightly as shown (Fig. 15). During the travel over the tracks 64, the cartons pass over a plow 66 which swings their inner flaps downwardly. A plate 68 extends between the platform and the plow for supporting the jars and dividers as the cartons pass to the plow.

During the continued travel of each carton over the plow the inner flaps engage curved rods 70 which swing them upwardly into horizontal position.

As the cartons leave the rear end of the plow 66, they slide over an upwardly and rearwardly inclined bar 71 and track 72, the bar 71 being narrow and being engaged by the centers of the cartons between the jars. The inner flaps 8 slide on the tracks 72 (Figs. 1, 3 and 17). The cartons are prevented from tilting materially as they travel between the belts 74 by means of longitudinally extending rods 73 arranged adjacent the path of travel of the tops of the cartons, the rods being supported by brackets 75 on the machine frame.

As the cartons are thus pushed over the front end portion of the tracks 72, they enter between the inner stretches of horizontal belts 74 which grip the upper end edges of the cartons and traverse them rearwardly over the bar 71 and tracks 72. The speed of travel of the gripping belts 74 is such with relation to the speed of travel of the column of cartons fed by the ram 48, as to cause the cartons to be spaced predetermined distances apart as shown as they pass between the belts 74.

The belts 74 pass over pulleys 76, and shafts 78 carrying the rear pulleys are driven so as to drive the belts, by a shaft 80 which is connected with the rear pulley shafts through miter gears 82 (Figs. 1, 3 and 17). This shaft 80 is driven by a shaft 84 through a chain and sprocket connection 86, which in turn is driven through a chain and sprocket connection 88 with a shaft 90 connected with the shaft of an electric motor 91.

The inner stretches of the belts 74 are yieldingly pressed inwardly so as to cause them to grip the cartons, by means of grooved rolls 92 that are mounted on arms 94 pivoted on stud shafts 96 secured to longitudinally extending frame members 98. Each grooved roll 92 is pressed against its belt 74 by a coiled spring interposed between the free end of arm 94 and a bracket member secured to frame member 98.

The front portions of the inner stretches of the belts 74 converge as shown so as to cause the belts to gradually grip the cartons presented thereto, thus ensuring smooth and uniform gripping of the cartons.

The center carton supporting bar 71 has one end loosely mounted on a rubber pad 100 on a cross frame member 102, said end being received in a groove in an angle iron 104 so as to hold the end laterally in position (Fig. 18). The other end of the bar 71 rests on the upper end of a rod 106. The lower end of this rod engages a cam 107 on the shaft of an electric motor 109, the rod being pressed downwardly against the cam by a spring 108. By this means the bar 71 is vibrated so as to cause gentle vibration of the cartons and dividers supported thereby.

As the cartons approach the rear ends of the belts 74 and pass the rear end of the vibrating bar 71, they are supported by a corresponding stationary bar 110. This bar 110 has one end secured to the frame member 102, and its other end secured to a flange 112 on an apron 114 secured to the rear ends of the tracks 72. The cartons, as they leave the belts 74, slide over the apron 114 and are discharged free of the machine.

As each filled carton leaves the end of the inner flap opening plow 66, the jars therein drop from the carton upon the upper run of a belt conveyor 116. This belt run is spaced only a short distance, about two and one-half inches, from the top of the plow 66 so as to ensure against injury to the jars as they drop on the conveyor.

The belt conveyor 116 passes over pulleys 118. The rear pulley 118 is secured to the shaft 84 that drives the gripping belts 74. The belt conveyor 116 is driven at the same surface speed as the belts 74.

As the jars drop from the cartons on to the belt conveyor 116, and the cartons are gradually raised from the jars, the vibrating bar 71, by gently vibrating the cartons, ensures loosening any jars that might tend to stick or jam against the dividers or walls of the cartons, the jars gently dropping on the belt conveyor without danger of breaking or chipping thereof.

As the jars approach the rear end of the belt conveyor 116, curved rods 119 guide them off the conveyor on to the usual filling line conveyor 120, said guide rods serving to assemble the jars in a single line as they pass to the line conveyor.

The machine is provided with means for controlling the operation of the two carton feeding rams 22 and 48 so as to ensure the jars being delivered to the filling line conveyor on the demand of the line conveyor and at the desired rate of feed of the jars to the filling machine.

To provide for this, the solenoid valves 42 and 62 for controlling the operation of the rams 22 and 48 are under the control of a photoelectric cell 122 and light 124 (Fig. 1).

As each group of jars passes the light beam they cause both of the rams to remain stationary, the ram 22 at the limit of its feeding stroke and the ram 48 retracted. As soon as a group of jars is carried past the beam of light, the feed sequence is allowed to commence.

If there are no jars in the beam of light, the circuit is completed to a switch 126 (Fig. 20). If a carton is on the inner flap opener platform 46, the arm of the switch 126 is rotated clockwise by the engagement of the end of the carton therewith, and the circuit is thus completed to the solenoid valve 62 which allows air under pressure to enter the ram cylinder 56 to move the ram 48 in a direction to push the carton from platform 46 on to the inner flap opening plow 66, and thus push another carton over the belt conveyor 116 of the unloading section of the machine.

When switch 126 is thus operated, the solenoid valve 42 of the outer flap opener is also energized to allow air under pressure to enter the ram cylinder 36 to retract the ram 22 as the ram 48 advances.

As the ram 48 moves the width of one carton, a projection 130 on the ram rotates the switch arm of a switch 134 reversing the air pressure to ram 48 to retract the ram.

When a carton has been moved out of the way of the arm of switch 126, the arm is rotated counterclockwise and thus completes the circuit to solenoid valve 42 through a switch 127 which reverses air pressure to ram 22, thus causing the ram to push another carton from the magazine and another on to the platform of the inner flap opener, thus starting the cycle again, provided no jars are in the beam of light of the photoelectric cell 122.

Thus it will be apparent that the photoelectric cell 122 and light 124 allow carton feed on the demand of the jar conveyor line. If jars should back up on to the case unloader conveyor, the carton feed will wait until the jars have moved on before feeding another carton.

The present application is a continuation of the application of Thomas E. Rose, Ser. No. 366,487, filed July 7, 1953, "Machine for Unloading Jars or the Like From Cartons," now abandoned.

What I claim is:

1. In a machine for unloading jars and the like from cartons of the class described, the cartons having inner and outer flaps that are left unsecured, the combination of a platform, means for intermittently delivering cartons to the platform, the outer flaps of the cartons being open and folded against the outer sides of the cartons, means comprising a reciprocating ram for successively feeding the cartons from the platform in a direction longitudinally of the inner flaps, the cartons as they are fed from the platform being arranged one against the other with the outer flaps of adjacent cartons abutting, means for opening the inner flaps as they are thus fed comprising a plow-shaped member adapted to be received between the inner flaps and the jars in each carton, the plow-shaped member causing the inner flaps to be swung downwardly, means for then swinging the inner flaps outwardly as each carton travels over said member so that both the outer and inner flaps are open as the cartons leave the rear end of said member, an endless conveyor having its upper run arranged to receive the jars as the cartons pass from the rear end of said member, means for raising the cartons from the jars as the jars are carried by the conveyor, said last-mentioned means including, a relatively narrow bar slidably traversed by the centers of the cartons moving thereover, means for vibrating said bar so as to cause gentle vibration of the cartons in contact therewith, and a pair of movable belts yieldingly gripping the sides of said cartons, said belts being narrow in comparison to the carton sides and engaging same near the top longitudinal edges thereof, means for continuously driving the conveyor in timed relation to the normal operation of said ram to cause the groups of jars from the cartons as they are received on the conveyor to be arranged in spaced relation, and means operable independently of the operation of said conveyor for rendering the ram operative to feed a carton to deliver a group of jars to the conveyor when the last group of jars delivered to the conveyor passes a fixed point, and inoperative in case the travel of said last group of jars is interrupted at said fixed point and until the travel of the group is resumed and it passes said point.

2. In a machine for unloading jars and the like from cartons of the class described, the cartons having inner and outer flaps that are left unsecured, the combination of a platform, means for intermittently delivering cartons to the platform, the outer flaps of the cartons being open, means comprising a reciprocating ram for successively feeding the cartons from the platform in a direction longitudinally of the inner flaps, means for opening the inner flaps as they are thus fed from the platform comprising a plow-shaped member adapted to be received between the inner flaps and the jars in each carton, an endless conveyor having its upper run arranged to receive the jars as the cartons pass from the rear end of said member, means for raising the cartons from the jars as the jars are carried by the conveyor, said last-mentioned means including, a relatively narrow vibrating member slidably traversed by the cartons moving thereover, and a pair of movable belts yieldingly gripping the opposite sides of said cartons, said belts being narrow in comparison to the carton sides and engaging said cartons near the top longitudinal edges thereof, means for continuously driving said conveyor and said belts in timed relation to the normal operation of said ram to cause the groups of jars from the cartons as they are received on the conveyor to be arranged in spaced relation, and means operable independently of the operation of said conveyor for rendering the ram operative to deliver a group of jars to the conveyor when one of the groups of jars delivered to the conveyor passes a fixed point, and inoperative in case the travel of the group is interrupted at said fixed point and until the travel of the group is resumed and it passes said point.

3. In a machine for unloading jars or the like from cartons of the class described, the cartons being provided with dividers for positioning the jars therein in longitudinally and transversely extending rows, the combination of a belt conveyor having its upper run arranged to convey jars removed from the cartons, a track arranged above the conveyor and inclined upwardly and rearwardly with relation thereto over which the cartons are adapted to be fed in inverted position so as to allow the jars to drop from the cartons upon the upper run of the conveyor free of the cartons, means for feeding the cartons over the track, a member extending longitudinally of the track so as to support the dividers and the cartons as the cartons travel over the forward portion of the track, said member engaging a divider between adjacent rows of jars, means for pivotally mounting the rear end of said member, and means engaging the front end of said member for vibrating the member vertically about its pivot.

4. In a machine for unloading jars or the like from cartons of the class described, the cartons having inner and outer flaps, the combination comprising means for feeding the cartons in inverted position one behind the other over a support, the flaps of the carton being open so as to cause the jars to slide on said support, a conveyor having its front end spaced a distance below the rear end of said support whereby the jars drop on said conveyor as they pass from said support, a track comprising two spaced rails inclined upwardly and rearwardly with relation to said conveyor for receiving the cartons as they leave said support, means for feeding the cartons along said track, the flat surfaces of the inner flaps of the cartons slidably traversing along said rails wherein said inner flaps are maintained open and substantially at right angles to the carton sides, a narrow and vibrating support extending longitudinally between the rails and between adjacent rows of jars in the cartons for maintaining the outer flaps open, and means for driving said conveyor in timed relation to said carton feeding means, said narrow support also being adapted for gently vibrating said cartons as they travel along said track, said means for feeding the cartons comprising, a pair of movable belts being relatively narrow in comparison to the sides of said cartons, said belts engaging the oposite sides of said cartons near the top longiutdinal edges thereof, and means for causing said belts to yieldingly grip said cartons.

5. In a machine for unloading jars or the like from cartons having opened inner and outer flaps, the cartons being provided with dividers for positioning the jars therein in longitudinally and transversely extending rows, the combination of a belt conveyor having its upper run arranged to convey jars removed from the cartons, a track arranged above the conveyor and inclined upwardly and rearwardly with relation thereto over which the cartons are adapted to be fed in inverted position so as to allow the jars to drop from the cartons upon the upper run of the conveyor free of the cartons, one pair of flaps of each carton being slidably supported by said track as the cartons move therealong, the flat faces of said flaps extending right angles to the carton sides as they slidably traverse said track, movable means yieldingly gripping the sides of said cartons near the longitudinal top edges thereof for feeding the cartons over the track, a member extending centrally and longitudinally of the track over which the dividers and the cartons slide as the cartons travel over the forward portion of the track, the other pair of flaps of said cartons being held open by said member, and means for vibrating said member to vibrate the cartons.

6. In a machine for unloading jars or the like from cartons of the class described, the cartons having inner and outer flaps that are left unsecured, a magazine for receiving a stack of cartons having its bottom wall comprising longitudinally extending flanges that are inclined downwardly and inwardly and spaced apart, said magazine adapted to receive a stack of cartons in inverted position with the bottom carton resting on said flanges whereby the outer flaps of the bottom carton are partially opened by the weight of the jaws, a supporting member extending longitudinally beneath the bottom of the magazine for limiting the opening movement of said flaps, a ram adapted to be reciprocated to sucessively feed the cartons from the bottom of the stack, as each carton is thus fed the remaining cartons dropping upon the top of the ram, a supporting member for receiving each carton thus fed by the ram from the magazine, said supporting member having a plow-shaped end adapted to be received between the partially opened outer flaps of the carton and the inner flaps so as to support the carton and the contents thereof, the cartons sliding over said supporting member, and said plow-shaped end thereof serving to swing the outer flaps downwardly, means for thus reciprocating the ram, and guiding members associated with said supporting member for swinging said downwardly swung outer flaps upwardly in a vertical position against the sides of the cartons as the cartons are fed over said supporting member.

7. In a machine for unloading jars and the like from cartons of the class described, the cartons having inner and outer flaps that are left unsecured, the combination comprising a magazine for receiving a vertical stack of cartons in inverted position with said flaps underneath, a device adapted to successively feed the cartons from the bottom of the stack, a supporting member for receiving each carton thus fed by said device from the magazine, the magazine bottom having opposed spaced and downwardly inclined flanges extending inwardly toward each other upon which the bottom one of said stacked cartons rests in preparation to being fed to said supporting member, said flanges permitting a slight opening of the outer flaps of the bottom carton resting thereon, said supporting member having a plow-shaped end adapted to be received between the outer flaps of each carton and the inner flaps so as to support the carton and the contents thereof, the cartons sliding over said supporting member, and said plow-shaped end thereof serving to swing the outer flaps downwardly, means for thus operating the feeding device, and means along said supporting member for swinging said downwardly swung outer flaps upwardly in a vertical position against the sides of the carton as the cartons are fed over said supporting member, said device comprising, a reciprocating ram having opposed spaced and downwardly inclined portions extending inwardly toward each other and within said inclined flanges of said magazine bottom, said ram being in alignment with the confronting side of the bottom one of said stacked cartons for engaging same during a feeding stroke, said ram undergoing alternately a feeding and a retracting stroke, said ram portions sliding underneath the remaining cartons constituting said stack and supporting same during the feeding stroke wherein the aforesaid bottom one of said cartons is fed to said supporting member, said ram portions permitting partial opening of the outer flaps of the lowermost carton of the stack resting on said ram portions during the feeding stroke, the stack of cartons on said ram being dropped to the bottom of said magazine during the retracting stroke of said ram, wherein the carton previously resting directly on said ram portions becomes the bottom carton of the stack and is the next carton to be fed to said supporting member.

8. In a machine for unloading jars or the like from cartons of the class described, the cartons having inner and outer flaps that are left unsecured, the combination of a platform, means for intermittently delivering cartons to the platform in inverted position, the outer flaps of the cartons being open and folded against the outer sides of the cartons, a reciprocating device undergoing alternately a feeding and retracting stroke for successively feeding the cartons from the platform in a direction longitudinally of the inner flaps, the cartons as they are fed from the platform being arranged one against the other with the outer flaps of adjacent cartons abutting, means holding the outer flap confronting said reciprocating device of the last carton fed from the platform against the carton side as said device undergoes its retracting stroke, means for opening the inner flaps as they are thus fed comprising a plow-shaped member adapted to be received between the inner flaps and the jars in each carton, the plow-shaped member causing the inner flaps to be swung into open position, so that both the outer and inner flaps are open as the cartons leave the rear end of said member, an endless conveyor having its upper run arranged to receive the jars as the cartons pass from the rear end of said member, means for raising the cartons from the jars as the jars are carried by the conveyor, means for continuously driving the conveyor in timed relation to said feeding device to cause the groups of jars from the cartons as they are received on the conveyor to be arranged in spaced relation, and means operable independently of the operation of said conveyor for rendering said feeding device inoperative to feed a carton to deliver jars to the conveyor when the spaced relationship of the groups of jars previously delivered to the conveyor is interrupted and until the said spaced relationship of the groups of jars is restored.

References Cited in the file of this patent

UNITED STATES PATENTS

| 2,051,105 | Roberts | Aug. 18, 1936 |
| 2,323,852 | Seidel et al. | July 6, 1943 |
| 2,368,020 | Hall | Jan. 23, 1945 |
| 2,586,172 | Murphy | Feb. 19, 1952 |
| 2,617,543 | Fahey | Nov. 11, 1952 |
| 2,648,450 | Neal | Aug. 11, 1953 |

UNITED STATES PATENT OFFICE

CERTIFICATE OF CORRECTION

Patent No. 2,935,215                                May 3, 1960

Thomas E. Rose

It is hereby certified that error appears in the printed specification of the above numbered patent requiring correction and that the said Letters Patent should read as corrected below.

Column 7, line 24, for "jaws" read -- jars --; column 8, line 51, after "deliver" insert -- a group of --.

Signed and sealed this 11th day of October 1960.

(SEAL)
Attest:

KARL H. AXLINE

Attesting Officer

ROBERT C. WATSON

Commissioner of Patents